United States Patent Office 3,429,837
Patented Feb. 25, 1969

3,429,837
POLYURETHANE FOAMS CONTAINING TERTIARY ESTERS OF PHOSPHOROUS ACID
John Langrish and Philip David Perry, Manchester, England, assignors to Imperial Chemical Industries Limited, London, England, a corporation of Great Britain
No Drawing. Filed Oct. 8, 1965, Ser. No. 494,249
Claims priority, application Great Britain, Oct. 20, 1964, 42,732/64, Patent 1,086,736
U.S. Cl. 260—2.5
Int. Cl. C08g 22/44
10 Claims

ABSTRACT OF THE DISCLOSURE

A polyurethane foam prepared by reacting organic polyisocyanate with a hydroxyl group-containing polyester in the presence of a gas-generating agent, an organic halogen compound having a boiling point above 75° C. at atmospheric pressure and from 0.1% to 5% based on the weight of the polyester of a tertiary ester of phosphorous acid having the following structures:

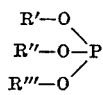

or

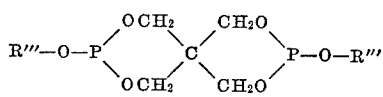

wherein R′, R″, and R‴ individually represent an unsubstituted or hydrocarbon substituted alkyl, aralkyl, cycloalkyl or aryl group; said tertiary ester of phosphorous acid being used to prevent scorching and discoloration of the polyurethane foam.

---

This invention relates to improvements in or relating to polymeric materials and more particularly foamed polyurethane materials.

The manufacture of foamed polyurethane materials by the reaction of an organic polyisocyanate with a hydroxyl group-containing polyester in the presence of a gas-generating agent is well-known. It is also known, for example from our specifications 889,720 and 895,967 to include an organic halogen compound in the foam-forming reaction mixture in order to improve the flame-resistance of the foamed product. Unfortunately, the inclusion of such flame-proofing agents seriously aggravates a problem which is already present to some extent in polyurethane foams made from polyesters, namely, that of scorching. The term "scorching" is commonly applied to the discoloration varying in shade from yellow to brown, or degradation which often occurs in foamed polyurethanes and is especially marked at the centre of large blocks of foam. It is convenient to assess the degree of "scorching" by reference to the following scale where whole numbers indicate the type of discoloration or, a pair of adjacent numbers for example 3–4, indicates a degree of scorch judged intermediate in severity between the degree of scorching indicated by either of the numbers taken singly. The following scale is used:

No scorching or discoloration _____ 5
Very slight discoloration _____ 4
Pale yellow-brown discoloration _____ 3
Light brown discoloration _____ 2
Brown discoloration _____ 1

This scorching is apparently largely due to the high temperatures which are developed in the foam towards the end of the highly exothermic foam-forming reaction. Furthermore it is common practice to maintain freshly prepared polyurethane foams at elevated temperatures, for example 120°–140° C., for periods of up to two hours or more in order to accelerate the attainment of the ultimate mechanical properties. The presence of an organic halogen compound in the reaction mixture in many cases has the effect of increasing scorch to a quite intolerable level. The reason for this is not fully understood.

It has now surprisingly been found that this difficulty may be obviated or minimised if there is included in the foam-forming reaction mixture a tertiary ester of phosphorous acid.

Accordingly, the present invention provides a foamed polyurethane material prepared by reacting an organic polyisocyanate with a hydroxyl group-containing polyester in the presence of a gas-generating agent and an organic halogen compound having a boiling-point above 75° C. at atmospheric pressure characterised in that there is also present in the reaction mixture a teritary ester of phosphorous acid.

By a tertiary ester of phosphorous acid is meant a compound of the formula:

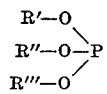   Formula I wherein R′, R″ and R‴ represent unsubstituted or substituted alkyl, aralkyl, cycloalkyl or aryl groups and may be the same or different; R′ and R″ together may also represent two of the said groups which are joined so as to form a bifunctional group which with the oxygen atoms to which it is attached and the phosphorous atom forms a cyclic structure, or R′, R″ and R‴ may represent three of the said groups which are joined so as to form a trifunctional group which with the oxygen atoms to which it is attached and the phosphorous atom forms a bicyclic structure.

The alkyl groups which R′, R″ and R‴ may represent may have a straight chain or may be branched, may be saturated or unsaturated, and may be unsubstituted or may carry one or more substituents. As examples of such groups there may be mentioned methyl, n- and iso-propyl, n-, sec-, iso- and tertbutyl, n-dodecyl, 2-hydroxyethyl, 2-chloroethyl, 2-ethoxyethyl, 2-(diethylamino)ethyl, allyl and oleyl.

As examples of the aralkyl groups which R′, R″ and R‴ may represent there may be mentioned benzyl, o- m- and p-chlorobenzyl, cumyl and phenylethyl.

As examples of the cycloalkyl groups which R′, R″ and R‴ may represent there may be mentioned cyclopentyl, cyclohexyl, α-tetralyl, and methylcyclohexyl.

As examples of the aryl groups which R′, R″ and R‴ may represent there may be mentioned phenyl, tolyl and naphthyl groups which may be unsubstituted or may carry substituents. Examples of suitable substituents include halogen atoms and alkyl, alkoxy, carboalkoxy, nitro and dialkylamino groups.

As examples of the bifunctional groups which R′ and R″ together may represent there may be mentioned ethylene, propylene and butylene.

As examples of the trifunctional groups which R′, R″ and R‴ together may represent there may be mentioned the groups of the formulae:

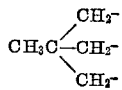   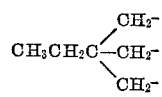

The tertiary esters of phosphorous acid also include esters in which two acid residues are linked by a common alcohol residue. Such esters include in particular compounds of the formula:

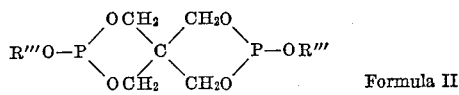

Formula II wherein R''' has the same significance as hereinbefore.

Tertiary esters of phosphorous acid may be obtained by methods which are well-known. For example, they may conveniently be obtained by reacting a phosphorus trihalide with a monohydric or a polyhydric alcohol or phenol or with a mixture thereof in the presence of a base. Suitable phosphorus trihalides for use in this method of preparing tertiary phosphorous esters include phosphorus tribromide, phosphorus triiodide and especially phosphorus trichloride. Suitable monohydric alcohols for use in this method of preparing tertiary phosphorous esters include aliphatic alcohols such as methanol, ethanol, butanol, octanol, nonanol, dodecanol and cetyl alcohol, araliphatic alcohols such as benzyl alcohol and cycloaliphatic alcohols such as cyclopentanol, cyclohexanol and methylcyclohexanol; and suitable polyhydric alcohols include ethylene glycol, 1:3-propandiol, 1:3-butandiol, cyclohexan - 1:2-diol, glycerol, pentaerythritol, 1:1:1-trimethylolethane and 1:1:1 - trimethylolpropane. Suitable phenols for use in the preparation of tertiary phosphorous esters wherein at least one of the groups R', R'' and R''' is an aryl group include phenol, alkylphenols such as o-, m- and p-cresols and nonylphenols, α and β-naphthols, nitrophenols, chlorophenols and alkoxyphenols.

A preferred class of tertiary esters of phosphorus acid for use in the process of the present invention are esters in which at least two of the groups R', R'' and R''' are aryl groups. As examples of this class there may be mentioned triphenyl phosphite, tricresyl phosphite, tris-p-nonylphenyl phosphite, tri-β-naphthylphosphite, tris-p-chlorophenyl phosphite, tris-p-nitrophenyl phosphite.

Another preferred class of tertiary esters of phosphorous acid which are particularly effective in the process of the present invention are the cyclic phosphites. These cyclic phosphites includes monocyclic and bicyclic phosphites and include compounds of Formula II and those compounds of Formula I in which R' and R'' together represent a bifunctional group as hereinbefore defined or R', R'' and R''' together represent a trifunctional group as hereinbefore defined. Particularly preferred are the compounds of Formula II and compounds of the following formulae:

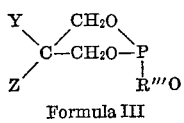 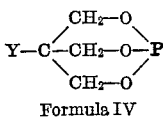

Formula III          Formula IV wherein Y and Z represent hydrogen atoms or alkyl groups and may be the same or different, and R''' has the same significance as hereinbefore. Not only are such cyclic phosphites particularly effective in reducing scorch in polyester-based foams, but they have the advantage of low odour when compared with the lower trialkyl phosphites which have an unpleasant odour. As examples of such cyclic phosphites there may be mentioned 1-methyl-4-phospha - 3:5:8 - trioxabicyclo-[2:2:2]-octane, 1-methoxy-1-phospha - 2:5 - dioxacyclopentane and 3:9 - diethoxy-2:4:8:10-tetraoxa-3:9-diphosphaspiro-5:5-undecane.

As examples of other tertiary esters of phosphorous acid which may be used in the process of the present invention, mention may be made of trimethyl phosphite, triethyl phosphite, triisopropyl phosphite, tri-n-butyl phosphite, tri-n-dodecyl phosphite, tris-2-methoxyethyl phosphite, tris-2-chloroethyl phosphite, dimethyldodecyl phosphite, bis(dodecyl)methyl phosphite, tribenzyl phosphite and tricyclohexyl phosphite.

The amount of the tertiary ester of phosphorous acid which it is necessary to incorporate in the polyurethane foam-forming reaction mixture will necessarily depend to a considerable extent upon the particular formulation and conditions employed. Thus, formulations containing large amounts of the organic halogen compound normally require the use of larger proportions of the tertiary phosphorous ester than formulations containing smaller amounts of organic halogen compound. The modification of a reaction mixture in such a manner as to increase the exothermic heat of reaction will also normally result in an increased requirement of tertiary phosphorous ester. The amount of said tertiary ester added normally falls in the range of from 0.1% to 5.0%, preferably from 0.5% to 2.0% by weight of the hydroxyl group-containing polyester. The said tertiary esters may be conveniently incorporated in the foam-forming reaction mixture in the form of solutions or dispersions in one or more of the other ingredients of the mixture, or added separately either alone or in admixture with an inert medium.

The starting materials to be used in the production of the foamed polyurethanes of the present invention are those more fully described in the prior art.

Examples of suitable organic polyisocyanates include aliphatic diisocyanates such as hexamethylene diisocyanate, aromatic diisocyanates, such as tolylene-2:4-diisocyanate, tolylene-2:6-diisocyanate, diphenylmethane-4:4'diisocyanate, 3-methyldiphenylmethane-4:4'-diisocyanate, m- and p-phenylene diisocyanates, chlorophenylene-2:4-diisocyanate, naphthalene-1:5-diisocyanate, diphenyl-2:4' - diisocyanate, 3:3'-dimethyldiphenyl-4:4'-diisocyanate, or diphenyl ether diisocyanate and cycloaliphatic diisocyanates such as dicyclohexylmethane diisocyanate. Triisocyanates which may be used include aromatic triisocyanates such as 2:4:6-triisocyanatotoluene and 2:4:4'-triisocyanatodiphenylether. Examples of other suitable organic polyisocyanates comprise the reaction products of an excess of a diisocyanate with polyhydric alcohols such as trimethylolpropane and uretidione dimers and isocyanurate polymers of diisocyanates, for example, of tolylene 2:4-diisocyanate. Mixtures of polyisocyanates may be used. Examples of suitable mixtures include the polyisocyanate compositions obtained by the phosgenation of the mixed polyamine reaction products of formaldehyde and aromatic amines such as aniline and orthotoluidine.

The hydroxyl group-containing polyesters may be made, for example, from dicarboxylic acids and polyhydric alcohols. Suitable dicarboxylic acids include succinic, glutaric, adipic, suberic, azelaic, and sebacic acids as well as aromatic acids such as phthalic, isophthalic and terephthalic acids. Mixtures of acids may be used. Examples of polyhydric alcohols include glycols such as ethylene glycol, 1:2-propylene glycol, 1:3-butylene glycol, diethylene glycol, trimethylene glycol, tetramethylene glycol, pentamethylene glycol, hexamethylene glycol, decamethylene glycol and 2:2-dimethyltrimethylene glycol. Mixtures of glycols may be used and other polyhydric alcohols, such as trimethylolpropane, pentaerythritol or glycerol, may be included in varying amounts, or used alone according to the desired rigidity of the products. The polyesters may contain amide groups introduced by including a proportion of diamine or aminoalcohol in the polyester-forming reaction mixture. Suitable diamines and aminoalcohols include ethylene diamine, hexamethylene diamine, tolylene, diamines and ethanolamine. The polyesters suitably have molecular weights between 200 and 6000.

Gas-generating agents which may be used in the process of the present invention include water, inert low boiling-point liquids and mixtures thereof.

When water is used as a gas-generating agent it is usually employed in amounts of from 1% to 10% by weight of the hydroxyl group-containing polyester.

The proportion of water employed in the foam-forming reaction mixture has a very marked effect upon the exothermic heat of reaction and therefore upon the degree of scorch. Consequently the tertiary phosphorus esters are found to be particularly valuable additives to reaction mixtures which contain 3% or more by weight of water based on the hydroxyl group-containing polyester.

Suitable inert low boiling-point liquids are liquids that are inert towards the polyurethane foam-forming ingredients and have boiling points not exceeding 75° C. at atmospheric pressure and preferably between —40° C. and 50° C. Examples of such liquids are halogenated hydrocarbons such as methylene chloride, trichloromonofluoromethane, dichlorodifluoromethane, dichloromonofluoromethane, monochlorodifluoromethane, dichlorotetrafluoroethane, 1:1:2 - trichloro-1:2:2-trifluoroethane, dibromodifluoromethane and monobromotrifluoroethane. Mixtures of these low-boiling point liquids one with another and/or with other substituted or unsubstituted hydrocarbons may also be used. Such liquids are usually employed in amounts of from 1% to 100% preferably 5% to 50% by weight of the polyhydroxy compound.

The organic halogen compound used as flame-proofing agent in the process of the present invention has a boiling-point above 75° C. at atmospheric pressure and should contain at least 10% and preferably at least 30% by weight of halogen. It is preferred that the halogen should be chlorine or bromine but it may be fluorine or iodine if desired. It is also preferred to use compounds in which at least one halogen atom is attached to an aliphatic carbon atom since these are most effective as flame-proofing agents.

As examples of suitable organic halogen compounds there may be mentioned tris-2-chloroethyl phosphate, tris-2-bromoethyl phosphate, tris-2-chloropropyl phosphate, tris-2:3-dibromopropyl phosphate, tris-2:3-dichloropropyl phosphate, 2:3-dichloropropanol, 2:3-dibromopropanol, 2:3-dichlorobutanol, 2:2:2 - tribromoethanol, benzyl chloride, benzyl bromide, 2:3-dibromopropionic acid and chlorinated or brominated anilines, N-methylanilines and toluidines. The organic halogen compound may, if desired, be a polymeric compound, for example a polyester obtained by condensing a polyhydric alcohol with hexachloroendomethylene tetrahydrophthalic acid or tetrabromophthalic anhydride.

The proportion of the organic halogen compound to be used to produce the polyurethane foam of the present invention depends to a very large extent upon the halogen content of the compound. The amount used is usually in the range of from 5% to 30%, preferably from 7.5% to 15% by weight of the hydroxyl group-containing polyester.

If desired there may also be included in the polyurethane foam-forming reaction mixture a catalyst. Suitable catalysts are well-known in the art and include in particular tertiary amines. Examples of suitable tertiary amines include triethylamine, dimethylethylamine, dimethylbenzylamine, dimethylcyclohexylamine, dimethylphenylethylamine, tetramethyl - 1:3 - butanediamine, triethylene diamine, N - alkylmorpholines, N - alkylpyrrolidines, N - alkylpiperidines, pyrrolizidine, β - dimethylaminopropionamide and fully N-substituted 4-aminopyridines such as 4-dimethylaminopyridine. Amine salts such as dimethylbenzylamine lactate are also suitable. Other suitable catalysts include non-basic organic compounds of metals, for example dibutyltin dilaurate, dibutyltin diacetate, iron acetylacetonate, manganese acetylacetonate, stannous carboxylates such as stannous octoate and lead carboxylates such as lead acetate and lead octoate. Mixtures of catalysts are often particularly advantageous.

Whilst the tertiary esters of phosphorous acid are extremely effective themselves in reducing scorching in polyurethane foams which contain an organic halogen compound as flame-proofing agent, it has been found that when a phenolic antioxidant is used together with the tertiary ester a further improvement in effect is obtained giving a degree of protection against scorching that is considerably greater than the sum of the effects due to the individual agents used alone.

Thus according to a preferred embodiment of the present invention there is provided foamed polyurethane materials prepared by reacting an organic polyisocyanate with a hydroxyl group-containing polyester in the presence of a gas-generating agent and an organic halogen compound characterised in that there are also present in the reaction mixture a tertiary ester of phosphorous acid and a phenolic antioxidant.

By a phenolic antioxidant is meant a phenol having antioxidant properties, and in particular an ortho- substituted phenol. Particularly suitable for use as phenolic antioxidants are phenols carrying substituents, especially alkyl and aralkoxy substituents, in each of the positions ortho to the phenolic hydroxyl group, and bis-phenols corresponding with the following formulae:

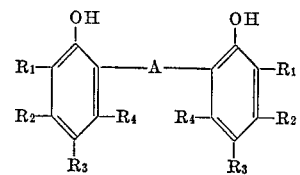

and

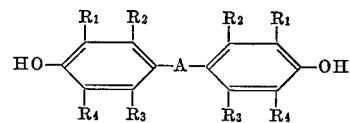

wherein A represents an alkylene or alkylidene radical or a sulphur atom, $R_1$ represents an alkyl or an alkoxy groups and $R_2$, $R_3$ and $R_4$ represent hydrogen atoms or alkyl groups and may be the same or different. As examples of such phenolic antioxidants there may be mentioned 2-(α-methylcyclohexyl) - 4:6 - dimethyl phenol, bis - (3 - t - butyl - 5 - methyl - 2 - hydroxyphenyl)methane, 2 - t - octyl - 4:6 - dimethylphenol, 2:6 - di - t - butyl - 4 - ethylphenol, bis - (3 - (α - methylcyclohexyl) - 5 - methyl - 2 - hydroxyphenyl)ethane, bis - (3 - t - butyl - 5 - methyl - 4 - hydroxyphenyl)sulphide and styrenated phenol. Also suitable are polyhydric phenols which may be substituted in the aromatic nucleus, examples of which include amongst others propyl gallate, 4-t-butylcatechol and hydroquinone.

Suitable proportions of phenolic antioxidants to be employed in the preferred embodiment of the present invention may be from .001% to 5% and preferably from 0.1% to 2.0% by weight of the hydroxyl group-containing polyester. The amount to be used in any particular case will, however, depend to a very large extent upon the particular materials being used. The phenolic antioxidants may be conveniently incorporated in the foam-forming reaction mixture in the form of solutions or dispersions in one or more of the other ingredients of the mixture.

The polyurethane foams of the present invention may be produced using any of the general methods described in the prior art for the production of foamed polyurethanes. Thus the foam-forming ingredients may be mixed continuously or discontinuously and the reaction mixture may include, in addition to the materials already described, other conventional additives. As described in the prior art, such additives may include surface active agents, for example oxyethylated alkyl phenols and sulphated long chain compounds, colouring matters, fillers and plasticisers.

In the continuous manufacture of flexible urethane foam it is usual to meter the separate ingredients to a mixing head and to deposit the blended ingredients on to a moving conveyor as is fully described in the prior art. The principal ingredients which are metered separately are: the hydroxyl group-containing polyester, the isocyanate, and an "activator" which generally comprises water, an amine catalyst and various water miscible surface-active agents. Other ingredients which are commonly metered separately or previously blended with all or part of the hydroxyl group-containing polyester are the flame-retarding agent and the inert low boiling-point liquid blowing agent.

The invention is illustrated but not limited by the following examples in which parts and percentages are by weight.

Example 1

The ingredients are continuously blended in the following proportions by weight:

| | |
|---|---:|
| Polyester: Polydiethylene adipate modified with pentaerythritol (hydroxyl value 60 mg. KOH/g.) | 100 |
| Isocyanate: 65/35 mixture of 2,4 and 2,6 isomers of tolylene diisocyanate | 62 |
| "Activator": | |
| Water | 5.0 |
| Octylphenol/ethylene oxide condensate | 1.0 |
| Ricinoleic acid/ethylene oxide condensate | 0.4 |
| Sodium salt of sulphated polyoxypropylene gylcol (M. wt. 2000) | 0.1 |
| N,N dimethyl cyclohexylamine | 0.65 |
| Flameproofing agent: Tris-β-chlorethyl phosphate | 10 |

When the combined ingredients are deposited on the moving conveyor at 40 kilograms per minute a block of foam is obtained 30 inches in width and about 20 inches in height. The central region of the block within about four inches from the top and sides is found to be "scorched" to a degree rated 1 on the scale hereinbefore described.

When 1 part of triphenyl phosphite is mixed with 10 parts of tris-β-chlorethyl phosphate and 11 parts of the blend are metered to the mixing head, a foam is obtained in which the degree of scorch is rated 4.

Example 2

In Example 1, 1 part of triphenyl phosphite and 0.5 part of 2(α-methylcyclohexyl)4,6-dimethylphenol are mixed and metered with the 10 parts of flame-proofing agent. The scorch is similarly reduced to a rating of 4–5.

Example 3

The ingredients are continuously blended in the following proportions by weight:

| | |
|---|---:|
| Polyester: Polydiethylene adipate modified with pentaerythritol (hydroxyl value 50 mg. KOH/g.) | 100 |
| Isocyanate: 80/20 mixture of 2,4 and 2,6 isomers of tolylene diisocyanate | 45 |
| "Activator": | |
| Water | 3.5 |
| Octylphenol/ethylene oxide condensate | 1.5 |
| Triethylene diamine | 0.12 |
| N,N dimethyl benzylamine | 1.0 |
| Polyoxypropylene/oxyethylene copolymer (mol. wt. 5000) | 0.5 |
| Flameproofing agent: Tris-β-chlorethyl phosphate | 10 |

When the combined ingredients are deposited on the moving conveyor at 40 kilograms per minute a block of foam is obtained 27 inches in width and about 24 inches in height having a scorch rating of 1–2.

If 1 part of diisodecyl-pentaerythrityl diphosphite and 0.5 part of tertiary-butyl catechol are mixed with the 10 parts of tris-β-chlorethyl phosphate and 11.5 parts of the blend metered to the mixing head, a foam is obtained in which the degree of scorch is rated 4–5.

Example 4

The ingredients are continuously blended in the following proportions by weight:

| | |
|---|---:|
| Polyester: As Example 1 | 100 |
| Isocyanate: As Example 3 | 62 |
| "Activator": | |
| Water | 5.0 |
| Octylphenol/ethylene oxide condensate | 1.0 |
| Polyoxypropylene/oxyethylene block copolymer | 1.2 |
| Sodium salt of sulphated polyoxypropylene gylcol | 0.4 |
| N-methyl morpholine | 1.5 |
| N,N-dimethyl cyclohexylamine | 0.2 |
| Inert-blowing agent: Trichloromonofluoromethane | 15 |
| Flameproofing agent: Tris-2,3-dibromopropyl phosphate | 7.5 |

When the combined ingredients are deposited on the moving conveyor at 31 kilograms per minute a block of foam is obtained 27 inches in width and 23 inches in height. The central region of the block within about 4 inches from the top, sides and base is severely scorched and is rated 1. When 1 part of triphenyl phosphite and 0.25 part of tertiary butyl catechol are mixed with the 7.5 parts of tris-2,3dibromopropyl phosphate and 8.75 parts of the blend metered to the mixing head a foam is obtained having a scorch rating of 4–5.

What we claim is:

1. A polyurethane foam prepared by reacting (i) a hydroxyl group-containing polyester with (ii) an organic polyisocyanate in the presence of (1) a gas-generating agent, (2) an organic halogen-containing compound having a boiling point above 75° C. at atmospheric pressure and (3) from 0.1% to 5%, based on the weight of said polyester, of a phosphorus-containing compound selected from the group consisting of (A) a tertiary ester of phosphorous acid having the formua

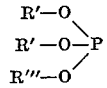

wherein R', R", and R''' individually represent an unsubstituted or hydrocarbon substituted alkyl, aralkyl, cycloalkyl or aryl group, with the provisos (a) that R' and R" may be joined with the oxygen atoms to which R' and R" are attached and the phosphorus atom so as to form a cyclic group and (b) that R', R" and R''' may be joined with the oxygen atoms to which R', R" and R''' are attached and the phosphorus atom so as to form a bicyclic group and (B) an ester of phosphorous acid having the formula

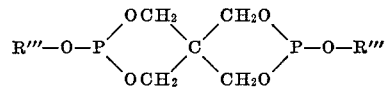

wherein R''' is as hereinbefore defined.

2. The polyurethane foam of claim 1 wherein said phosphorus-containing compound is selected from (A) and R' and R" are aryl.

3. The polyurethane foam of claim 1 wherein said (3) is present in an amount of from 0.5% to 2%.

4. The polyurethane foam of claim 1 wherein said (2) contains at least 10% by weight of halogen.

5. The polyurethane foam of claim 1 wherein said (2) is present in an amount of between 5% and 30%, based on the weight of said polyester.

6. The polyurethane foam of claim 2 wherein said foam additionally contains from 0.001% to 5%, based on the weight of said polyester, of a phenolic antioxidant.

7. The polyurethane foam of claim 6 wherein said phenolic antioxidant is an ortho-substituted phenol.

8. The polyurethane foam of claim 7 wherein the ortho-substituted phenol carries substituents in each of the positions ortho to the phenolic hydroxyl group.

9. The polyurethane foam of claim 7 wherein the phenolic antioxidant is a bis-phenol selected from the group of bis-phenols having the formulae

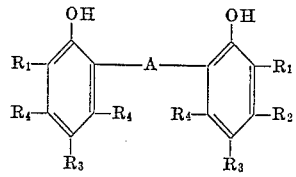

and

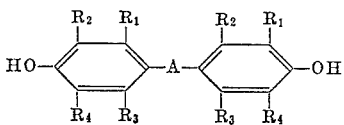

wherein A represents a member selected from the group consisting of alkylene and alkylidene radicals and a sulphur atom, $R_1$ represents a member selected from the group consisting of alkyl and alkoxy groups and $R_2$, $R_3$ and $R_4$ individually represent a member selected from the group consisting of hydrogen and alkyl groups.

10. The polyurethane foam of claim 6 wherein said foam contains from 0.1% to 2.5%, based on the weight of said polyester, of said phenolic antioxidant.

References Cited

UNITED STATES PATENTS

| | | | |
|---|---|---|---|
| 2,915,496 | 12/1959 | Swart et al. | 260—45.7 |
| 3,072,605 | 1/1963 | Rogers et al. | 260—45.95 |
| 3,205,269 | 9/1965 | Friedman | 260—611.5 |
| 3,208,959 | 9/1965 | Gmitter | 260—2.5 |
| 3,257,337 | 6/1966 | Schoepfle et al. | 260—2.5 |
| 3,265,774 | 8/1966 | Friedman | 260—953 |
| 3,330,783 | 7/1967 | Piechota et al. | 260—2.5 |

FOREIGN PATENTS

| | | |
|---|---|---|
| 842,271 | 7/1960 | Great Britain. |
| 945,479 | 1/1964 | Great Britain. |
| 974,308 | 11/1964 | Great Britain. |
| 1,146,656 | 4/1963 | Germany. |
| 1,150,199 | 6/1963 | Germany. |

DONALD E. CZAJA, *Primary Examiner.*

M. B. FEIN, *Assistant Examiner.*

U.S. Cl. X.R.

260—45.95, 927